Patented June 26, 1928.

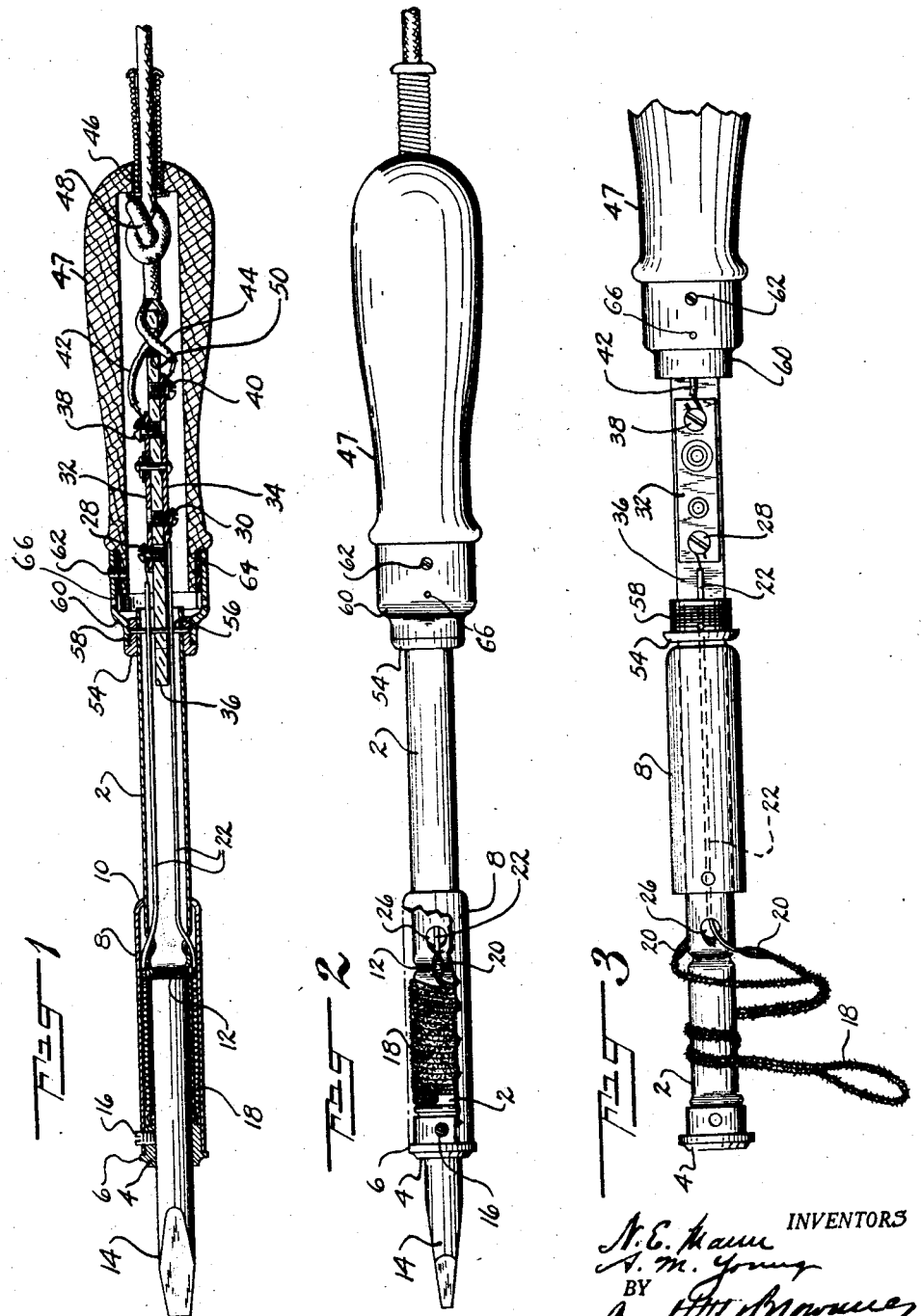

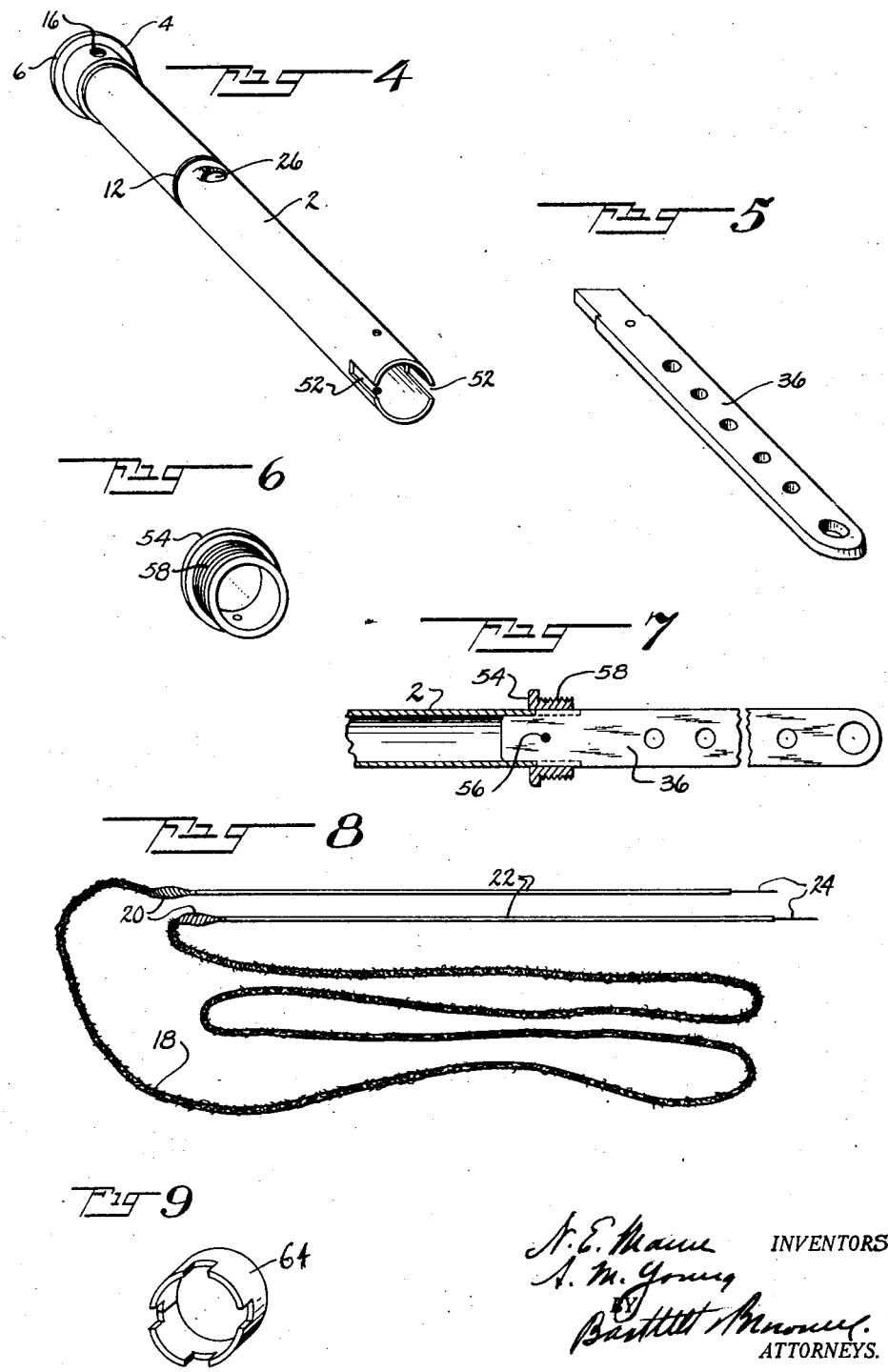

1,674,653

UNITED STATES PATENT OFFICE.

NELSON E. MANN, OF NEW BRITAIN, AND ALLAN M. YOUNG, OF MERIDEN, CONNECTICUT, ASSIGNORS, BY MESNE ASSIGNMENTS, TO MANNING, BOWMAN & CO., OF WILMINGTON, DELAWARE, A CORPORATION OF DELAWARE.

ELECTRIC SOLDERING IRON.

Application filed May 7, 1926. Serial No. 107,327.

Our invention relates to an improvement in electric soldering irons and has for its object to provide an electric soldering iron in which the element is mounted and encased in the new and improved manner and can be easily replaced in the field in case it breaks down. It further has for its object to provide a new and improved construction for mounting the base for the terminal plates within the handle of the soldering iron and for protecting the handle and connecting it to the other parts.

The following is a description of an embodiment of our invention reference being had to the accompanying drawings, in which:

Figure 1 shows a longitudinal section of a soldering iron embodying our invention;

Fig. 2 is a side elevation of the soldering iron with a part broken away;

Fig. 3 shows the soldering iron partially disassembled so that the heating element can be removed or replaced;

Fig. 4 shows in perspective, a detail of the members supporting the heating element;

Fig. 5 shows a perspective view of the base for supporting the terminal plates;

Fig. 6 is a perspective view of a bushing securing said base in position and forming a connection for the handle;

Fig. 7 shows the parts of Figs. 4, 5, and 6 assembled;

Fig. 8 is a detail view of the heating element;

Fig. 9 is a detail view of the ferrule lining.

Referring more particularly to the drawings, 2 is a tubular member having at its outer end an abutment 4, having a flange 6. 8 is a sleeve which is adapted to be moved upon the tubular member 2 so as to cover and uncover the heating element. Its outer end surrounds a portion of the abutment 4 and abuts the flange 6, and its inner end is constricted as at 10 so as to ride upon the tubular member and be guided thereby. The tubular member is provided with an indentation 12 forming a shoulder which acts as a stop for a removable head or tip 14. This point is inserted within the tube and is held in position by a set screw 16 which passes through the abutment and also passes through the sleeve 8 so as to secure both the head and the sleeve in place. Housed within the sleeve 8 is a heating element having a flexible portion 18 composed of a high resistance wire, such as nichrome, surrounded by suitable insulation such as a winding of asbestos. This high resistance wire is connected at the points 20 to the two relatively stiff copper wires 22 which are covered with insulation, except at their extreme ends 24. 26 are lateral openings in the tubular member 2 through which the low resistance copper terminals of the heating element are passed, the ends of the copper terminals extending to and secured by binding posts 28, 30 on terminal plates 32 and 34 mounted on an insulating base 36. These terminal plates also carry binding posts 38 and 40 to which supply conductors 42 and 44 entering through the opening 46 in the handle 47 are connected. These supply conductors are knotted, in the ordinary manner, as at 48 and are looped through an opening 50 in the insulating base. The contact plates 32 and 34 are insulated from one another so that in this way a circuit through the resistance element is completed.

In order to secure the insulating base 36 to the tubular member 2 the inner end of the tubular member 2 is provided with slots 52 between which the edge portions of the adjacent end of the insulating base lie. 54 is a bushing which is forced over the inner end of the tube 2 so as to clamp the slotted portions against the sides of the insulating base and hold it firmly in position. In order to secure the bushing in position, a pin 56 is passed through the bushing, tubular member 2 and base 36, as shown in Fig. 1.

The bushing is screw-threaded at its exterior, as at 58 and the handle 47 is provided with a correspondingly screw-threaded ferrule 60 which screws upon the bushing, and is in its turn secured to the handle by a screw 62. The handle 47 is made of wood and the ferrule 60 has a lining 64 of fibre or other material of low heat conductivity, preventing the conduction of heat to the handle and thus protecting it from becoming weakened by charring. Ventilating holes 66 are provided in the ferrule to permit heated air to pass off from the interior of the ferrule. These holes are spaced away from the handle and lining so that the air can freely pass. The forward end of the lining abuts against the end flange of said ferrule and is provided with notches which register with the openings 66.

The tubular member 2 is of substantially uniform diameter throughout its length. The base member 36 is flat and the end thereof which is within the tubular member 2 leaves passages within the tubular member in line with the perforations 26 through which the copper terminals 22 may be easily passed.

In case a resistance element burns out, the ferrule upon the handle is unscrewed from the bushing 54 and drawn back so as to expose the terminals 28 and 30. The resistance element is then disconnected therefrom. The set screw 16 is removed and the sleeve 8 is drawn back so as to expose the high resistance portion of the heating element. The heating element is then removed and the copper terminals of the new heating element are threaded through the holes 26 down past the clamped end of the insulating base and secured to the binding posts 28 and 30. The high resistance portion is then coiled about the tubular member 2 between the holes 26 and the abutment 4, being doubled on itself in the ordinary manner. The sleeve 8 is then slid into position, its right hand end being guided by the tube 2, the heating portion of the element being held tightly wound by one hand of the operator. The sleeve 2 can in this way be easily adjusted and when it is adjusted it is secured by the screw 16 which also holds the point.

With this construction a heating element can be easily renewed in the field, by an ordinary mechanic.

Not only can the heating element be easily renewed, but the construction of the iron as a whole is such that it can be easily manufactured and is rugged and durable.

As will be evident to those skilled in the art, our invention permits various modifications without departing from the spirit thereof or the scope of the appended claims.

What we claim is:

1. In a soldering iron, a handle, a tubular member secured thereto, having two lateral perforations spaced away from its outer end, an insulating base secured to its inner end and providing two channels on opposite sides thereof within said tubular member and in line with said perforations, terminal plates secured to opposite sides of said base and insulated from each other, a heating element having a flexible portion wound upon said tubular member and two substantially straight stiffer leads secured thereto and threaded through said two openings and said channels, respectively, and removably connected to said terminal plates respectively, said heating element with its leads being removable and replaceable as a unit, the loop of said element being wound around said tubular member between said openings and its outer end, and a shell surrounding said wound portion and said tubular member.

2. In a soldering iron, a handle, a tubular member secured thereto, having two lateral perforations spaced away from its outer end, an insulating base secured to its inner end and providing two channels on opposite sides thereof within said tubular member and in line with said perforations, terminal plates secured to opposite sides of said base and insulated from each other, a heating element having a flexible portion wound upon said tubular member and two substantially straight stiffer leads secured thereto and threaded through said two openings and said channels, respectively, and removably connected to said terminal plates respectively, said heating element with its leads being removable and insertable as a unit, the loop of said element being wound around said tubular member between said openings and its outer end, and a shell surrounding said wound portion and said tubular member, said tubular member having an enlargement upon its outer end adapted to enter the mouth of said shell, the inner end of said shell being partially closed so as to closely surround said tubular member and make sliding engagement therewith.

3. In a soldering iron, a handle, a tubular member secured thereto, having lateral perforations spaced away from its outer end, an insulating base secured to its inner end and providing channels on opposite sides thereof, terminal plates secured to opposite sides of said base and insulated from each other, a heating element having a flexible portion and stiffer leads secured thereto, each threaded through one of said openings and channels and removably connected to said terminal plates respectively, the loop of said element being wound around said tubular member between said openings and its outer end, and a shell surrounding said wound portion and said tubular member, a removable tip entering the outer end of said tubular member, and a set screw adjacent to the outer end of said shell for holding said tip and shell in position relatively to said tubular member.

4. In a soldering iron, a handle, a tubular member secured thereto, having lateral perforations spaced away from its outer end, an insulating base secured to its inner end and providing channels on opposite sides thereof, terminal plates secured to opposite sides of said base and insulated from each other, a heating element having a flexible portion and stiffer leads secured thereto threaded through said openings and removably connected to said terminal plates respectively, the loop of said element being wound around said tubular member between said openings and its outer end, and a shell surrounding said wound portion and said tubular member, said tubular member having an enlargement upon its outer end adapted to enter the mouth of said shell, the inner end of said shell being partially closed so as to closely surround said tubular member and make sliding engagement therewith, a removable tip entering the outer end of said tubular member, said tubular member having an indentation forming a stop limiting the inward movement of said tip, and a set-screw passing through said shell and enlarged portion at a point adjacent to the forward end of said shell and securing said tip and shell thereto.

5. In a soldering iron, a handle, a tubular member secured thereto having lateral perforations spaced away from its outer end, an insulating base secured to its inner end and providing channels on opposite sides thereof, terminal plates secured to opposite sides of said base and insulated from each other, a heating element having a flexible portion and stiffer leads secured thereto threaded through said openings and removably connected to said terminal plates respectively, said heating element with its leads being removable and replaceable as a unit, the loop of said element being wound around said tubular member between said openings and its outer end, and a shell surrounding said wound portion, said tubular member having a slit in its inner end into which said insulating base enters, a bushing upon its inner end causing said split end to clamp said base, and means for securing said bushing to said tubular member.

6. In an electrically heated soldering iron, a wooden handle, a ferrule on the forward end thereof, a metal shank carrying an electrically heated point, a metallic bushing carried by said shank, said bushing being carried by said ferrule, and a lining of low heat conductivity within said ferrule separating said ferrule from said handle so as to protect said handle, said ferrule having ventilating openings in the forward end thereof and an abutment engaged by the forward end of said lining, said forward end of said lining having notches registered with said openings.

In testimony whereof, we have signed our names to this specification this 28 day of April, 1926.

NELSON E. MANN.
ALLAN M. YOUNG.